Sept. 6, 1960

T. BACKUS 2,951,392

AUTOMATIC DEVICE

Filed Nov. 1, 1957

INVENTOR.
THOMAS BACKUS
BY
Woodhams Blanchard & Flynn
ATTORNEYS

Sept. 6, 1960 T. BACKUS 2,951,392
AUTOMATIC DEVICE
Filed Nov. 1, 1957 3 Sheets-Sheet 2
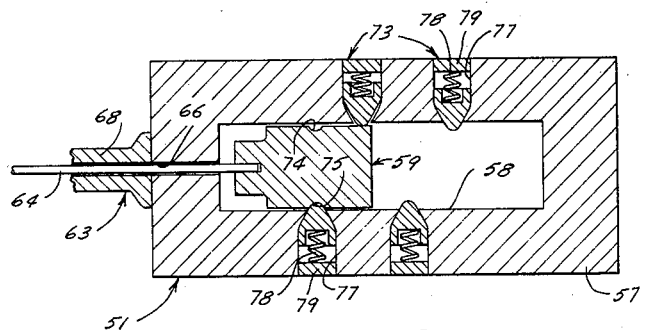
fig. 4
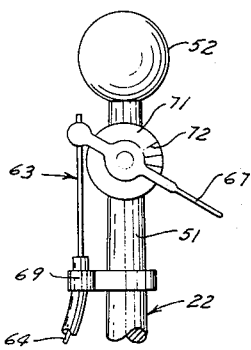
fig. 2
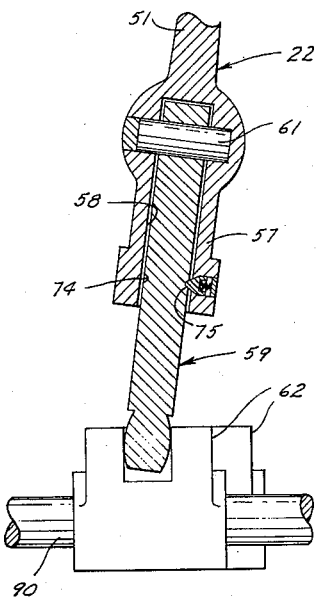
fig. 3
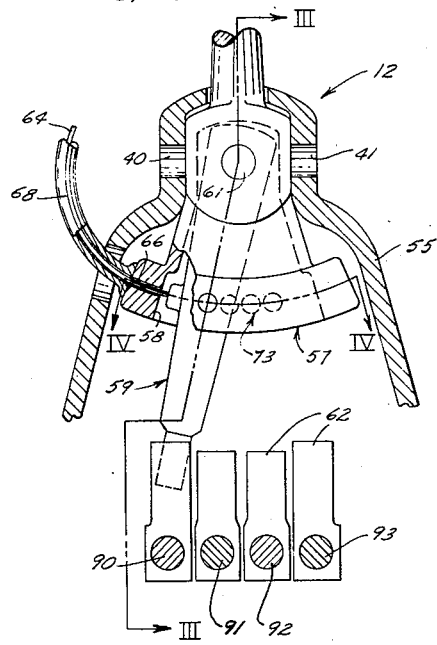
INVENTOR.
THOMAS BACKUS
BY
Woodhams Blanchard & Flynn
ATTORNEYS

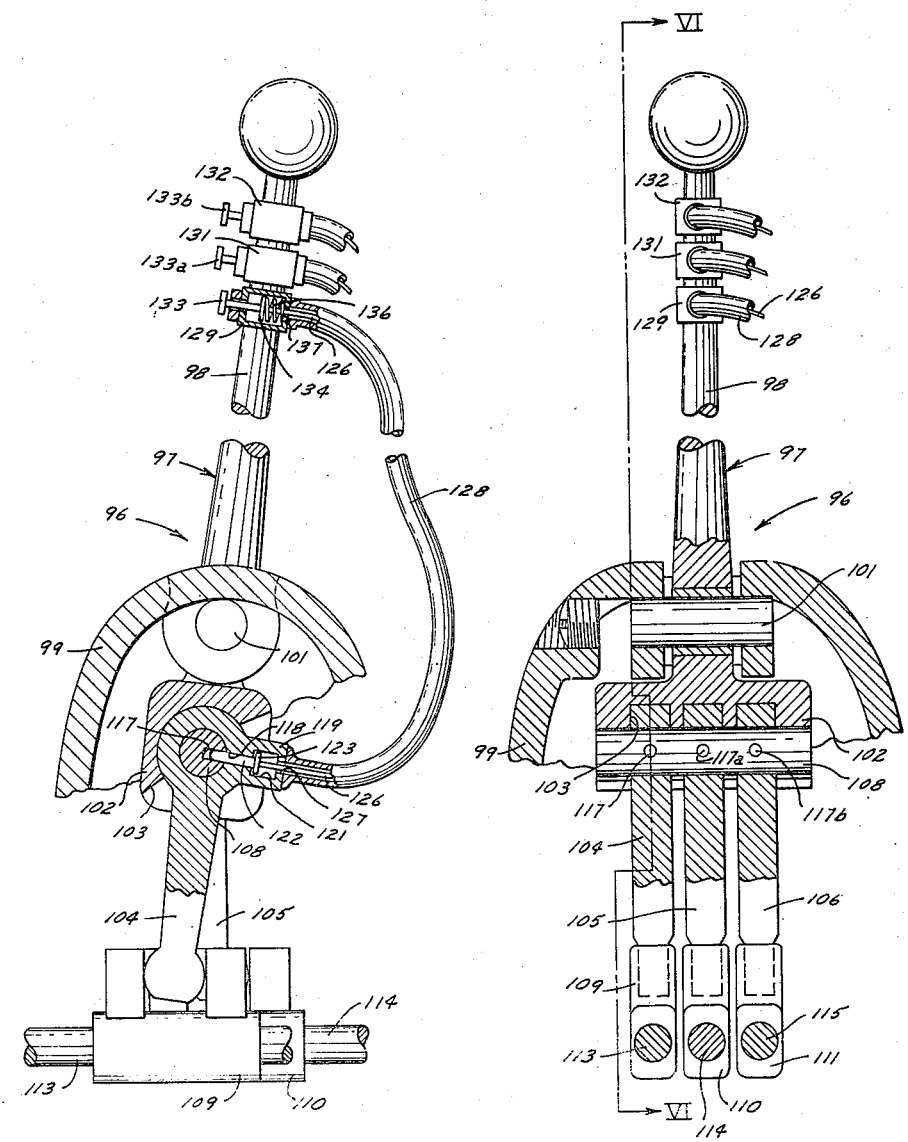

United States Patent Office 2,951,392
Patented Sept. 6, 1960

2,951,392

AUTOMOTIVE DEVICE

Thomas Backus, Kalamazoo, Mich., assignor, by mesne assignments, to Fuller Manufacturing Company, a corporation of Delaware Filed Nov. 1, 1957, Ser. No. 693,910

2 Claims. (Cl. 74—473)

This invention relates in general to a shift control mechanism for a multi-speed transmission having a plurality of shift rods which are axially movable for effecting changes in the ratio between the input and the output speeds of said transmission. More particularly, the invention relates to an articulated shift lever having a device for selectively causing one portion of said lever to engage, and effect movement of, any one of said shift rods while the other portion of said lever is movable substantially within one, and only one, plane.

The development of the multi-speed transmission, having more than the conventional three forward and one reverse shift positions, has, for a long time, created the problem of providing a shift mechanism which is capable of effecting all of the required shifts while retaining a manual shift pattern which is relatively simple to follow. Previous attempts to overcome this problem have included the combination of an auxiliary transmission with a main transmission. The auxiliary transmission, which is independently controlled, is used in some instances to "split" the ratios of the main transmission and in other instances it is used to shift the main transmission from one portion of a speed ratio range to another portion, whereby in such latter case the same speed ratios in the main transmission can be used over again.

These structures operate well enough but in pursuance of a constant effort to reduce the cost of transmissions and to improve their ease and simplicity of operation, new approaches to the design of speed ratio change devices are constantly being sought.

One of these new approaches is shown in patent application, Serial No. 551,056 and now Patent No. 2,892,358 of which this application is a continuation-in-part. Said Serial No. 551,056 discloses several forms of shift levers having means for selecting a desired group of shift rods whereby at least two different shift rods can be engaged by appropriate selecting means in all or certain desired single positions of the shift lever. Accordingly, the number of shift rods within the transmission can be increased while retaining a very simple manual shift pattern, such as the common H pattern.

While all embodiments disclosed in said Serial No. 551,056 utilize, though only illustratively, an H shift pattern, the principle employed therein could be extended to a further embodiment effecting a selection of multiple shift rods with the shift lever being confined to movement in only a single plane.

Accordingly, a primary object of this invention is the provision of a shift control mechanism for a multi-speed transmission having a plurality of shift rods and a manually operated, articulated shift lever, wherein the manually engageable portion of said shift lever can be moved in only a single plane and wherein a manually operable selector device causes the remainder of said shift lever to operate a selected one of said shift rods.

A further object of this invention is the provision of a shift mechanism, as aforesaid, wherein the selection of the desired shift rod with which said shift lever is to be operable, is effected by independent means mounted upon, and movable with, said manually engageable portion of the shift lever.

A further object of this invention is the provision of a shift mechanism for a multi-speed transmission, as aforesaid, wherein said manually engageable portion of the shift lever is movable within one, and only one, plane and the rod operating portion of said lever is movable in a plurality of directions and planes.

A further object of this invention is the provision of a shift mechanism, as aforesaid, which is simple in operation, which is relatively easy to fabricate, which is positive in operation, and which reduces to a minimum the shifting motions required of the operator.

Other objects and purposes of this invention will become apparent to persons familiar with this type of equipment upon reading the following specification and examining the drawings, in which:

Figure 2 is a broken, sectional view taken along the line II—II of Figure 1.

Figure 3 is a sectional view taken along the line III—III of Figure 2.

Figure 4 is a sectional view taken along the line IV—IV of Figure 2.

Figure 5 is a sectional, broken view substantially similar to that shown in Figure 2, but showing a modified form of shift lever.

Figure 6 is a sectional view substantially as taken along the line VI—VI of Figure 5.

Figure 1:
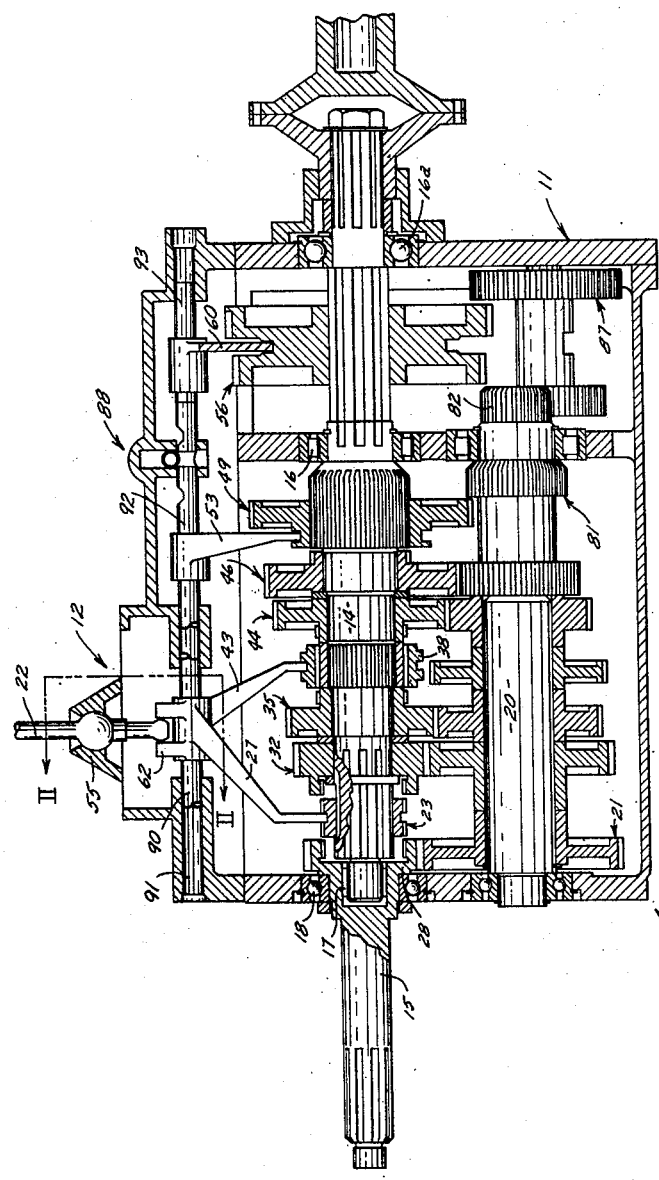
Figure 1 is a central, cross-sectional view of a multi-speed transmission of the type with which the shift mechanism of the invention is designed to be used.

For convenience in description, the terms "upper," "lower" and derivitives thereof will have reference to the shift mechanism of the invention in its normal position of operation, as appearing in Figures 1, 2 and 5. The terms "inner," "outer" and derivitives thereof will have reference to the geometric center of said transmission or said shift control mechanism and parts associated therewith.

*General description*

In order to meet the objects and purposes of this invention, including those set forth above, there has been provided a transmission having a plurality of shiftable elements therewithin arranged for effecting a plurality of speed ratios between the input shaft and output shaft of said transmission. Such transmission also has a plurality of chiftable rods which are connected to said shiftable elements and movable for effecting a change from one speed ratio to another. The shift mechanism includes an articulated shift lever which has a manually engageable portion and a rod selecting portion. The manually engageable portion is mounted on the transmission for movement in one, and only one, plane, which plane is parallel with the axis of movement of the shift rods. The rod selecting portion is movable to connect the manually engageable portion with a selected shift rod.

*Detailed construction*

As shown in Figure 1, the invention is characterized by a transmission 10 having a housing 11 upon which a shift control mechanism 12 (Figure 2) is supported in any convenient manner. Said transmission 10 (Figure 1) has a main shaft 14 supported within the housing 11 by means such as the bearings 16 and 16a. An input shaft 15, which is supported by means including the bearing 18, contains a pilot bearing 17 for supporting the adjacent end of the main shaft 14.

The input shaft 15 is connected to a countershaft 20 by means of the gears 28 and 21, respectively. Said input shaft 15 is directly connectible to the main shaft 14 by the gear 28 and shiftable element 23. The countershaft 20 is connectible to the main shaft 14 by means of the gear set 32 and the shiftable element 23, the gear set 35 and the shiftable element 38, the gear set 44 and said shiftable element 38, the gear set 46 and the shiftable gear 49, the gear 81 and shiftable gear 49, and the gear 82 and shiftable gear 56.

The shiftable gear 56 is also engageable with a reverse gear 87. The shiftable elements 23 and 38, and the shiftable gears 49 and 56 are engaged by the shift forks 27, 43, 53 and 60, respectively, which are mounted upon the shift rods 90, 91, 92 and 93, respectively. The shift lock mechanism 88, which may be substantially identical to the shift lock mechanism disclosed in Patent No. 2,637,221, may be provided for preventing more than one of said shift rods at a time from leaving the neutral position.

The shift lever 22 (Figures 1 and 2) is comprised of an upper control member 51 (Figure 2) having a manually engageable knob 52 secured to its upper end. The lower end of the control member 51 is comprised of an enlarged casing 57, which has a downwardly opening recess 58. Said casing 57 is disposed within a hollow pedestal 55, which is mounted upon the transmission housing 11 (Figure 1). The control member 51 is pivotally supported upon the pedestal 55 by means of the coaxial stub shafts 40 and 41 which extend from opposite sides of said member 51 near its lower end. The axes of said stub shafts are substantially horizontal and preferably perpendicular to the lengthwise extent of the shift rods 90, 91, 92 and 93.

The lever 22 (Figures 2 and 3) has an actuated element 59, the upper end of which extends into said recess 58 where it is pivotally supported upon the control member 51 by means of the pivot pin 61. The recess 58 is elongated in a direction substantially parallel with the pivot axis of the control member 51, and substantially perpendicular to the axis of the pivot pin 61, thereby permitting movement of the actuating element 59 in a direction perpendicular to the direction of movement of the control member 51. Thus, the actuating element 59 is movable transversely of said shift rods to engage any selected one of the shift yokes 62 disposed thereon.

A selector device 63 (Figure 2), which is supported upon the shift lever 22, is manually engageable to effect pivotal movement of the actuating element 59 transversely of said shift rods 90 through 93, inclusive. Said selector device 63 includes a flexible cable 64, which slidably extends through an appropriate cable opening 66 in one end of the casing 57 near the lower end thereof. One end of said cable 64 is secured to the actuating element 59, and the other end of the cable 64 is secured to one end of manually operable lever 67, which is pivotally supported between its ends upon the control member 51 adjacent to the knob 52. The cable 64 is surrounded by a cable housing 68, which is supported at its upper end upon the control member 51 by means of a bracket 69, and secured at its lower end to the casing 57, adjacent to the cable opening 66 therethrough. Thus, pivotal movement of the control lever 67 will operate through the cable 64 to effect a corresponding pivotal movement of the actuating element 59 transversely of said shift rods. A plate 71 having indicator lines 72 may be mounted upon the control member 51 adjacent to the control lever 67 to indicate the proper position of the lever 67 for a desired positioning of the actuating element 59.

Suitable detent means may be provided for assisting the operator to locate the actuating element 59 in operative engagement with the desired shift rod. One suitable embodiment of such detent means is illustrated and provides a plurality, here four, of detents 73 (Figure 4) in the lower end of the casing 57 positioned so that they extend into the recess 58 at selected intervals along the lengthwise extent of said recess. The actuating element 59 is provided with notches 74 and 75 on opposite sides thereof. Said detents 73 are arranged so that one thereof is snugly received into one of the notches 74 and 75, when the actuating element 59 is in proper shifting position with respect to one, and only one, of the shift yokes 62. Thus, one of the detents 73 will be in one or the other of the notches 74 and 75 whenever the control lever 67 is aligned with one of the indicator lines 72 on the indicator plate 71. Each detent 73 (Figure 4) is slidably disposed within a detent opening 77 in said casing 57, and is urged into the recess 58 by resilient means, such as the spiral spring 78, which is held under compression between the detent 73 and a plug 79 located in the outer end of the detent opening 77. Thus, it will be seen that, by appropriate positioning of the selector lever 67, the actuating element 59 can be moved into position for operating any one of the shift rods 90 through 93, inclusive, after which such operation of the selected shift rod can be effected simply by moving the control member 51 within a single plane.

*Operation*

When the shift mechanism 12, to which this invention relates, is in its neutral position, as shown in Figures 1 and 2, the shift yokes 62 will be aligned transversely of the lengthwise axes of the shift rods 90 through 93, inclusive. Thus, it will be possible, by movement of the selector lever 67, to pivot the actuating element 59 transversely of said shift rods into shifting position with respect to any selected one of the shift yokes 62. The indicator lines 72 and the detents 73 will locate and hold the actuating element 59 in position for engaging one, and only one, of the shift yokes 62 at a time. However, if the selector lever 67 is accidentally positioned so that the actuating element 59 is engaging two adjacent shift yokes 62, the shift lock mechanism 88 will prevent a shift in a conventional manner.

When the actuating element 59 has been placed in operating position with respect to the desired shift yoke 62, axial movement of the shift rod associated with said shift yoke can then be effected in the desired direction simply by moving the control member 51 about stub shafts 40 and 41, whereby a shift of the transmission 10 will be effected.

After a particular shift rod, hence the shift lever 22, has been moved into a shifted position, as shown in Figure 3, the end walls of the recess 58 in the casing 57 and/or the adjacent shift yokes 62 will positively prevent any substantial movement of the actuating element 59 away from the shift yoke on the shift rod which has just been shifted. More specifically, the selector device 63 can be operated to effect movement of the actuating element 59 from operable association with one shift yoke to operable association with another shift yoke when, and only when, the shift lever 22 is in, or substantially in, the neutral position.

The actuating element 59 can be properly positioned by visual reference to the position of the selector lever 67 with respect to the indicator lines 72 on said indicator plate 71. The actuating element 59 can also be positioned by physical reference to the walls of the recess 58 and the slight, but noticeable, opposition created by the detents 73 to the movement of the actuating element 59. For example, the two outside shift yokes can be easily located by moving the actuating element against one end wall or the other of the recess 58. Either of the two intermediate yokes can be located by moving the actuating element 59 away from the adjacent end wall of said recess 58 until said element 59 is released by the end detent and engaged by the next adjacent detent. Return of the shift lever to its center position will return the shifted shift rod to neutral, and the actuating element 59 may then, if desired, be caused to select another shift rod.

Modified structure

The shift mechanism 96, shown in Figures 5 and 6, includes a shift lever 97 having an upper control member 98, which is pivotally supported near its lower end within, and upon, the hollow pedestal 99 by the pivot pin 101. The lower end of the control member 98 has an enlarged, integral crosshead 102 containing a plurality, here three, of parallel and spaced slots 103, in which three actuating elements 104, 105 and 106 are receivable. The crosshead 102 and the upper portions of the actuating elements 104, 105 and 106, disposed within the slots 103, are provided with axially alignable openings through which the pivot shaft 108 is received for pivotally supporting said actuating elements upon the lower end of the control member 98. The axes of the pivot pin 101 and pivot shaft 108 are preferably substantially parallel.

The lower ends of the actuating elements 104, 105 and 106 (Figures 5 and 6) are each disposed within one, and only one, of the three shift yokes 109, 110 and 111 supported upon the shift rods 113, 114 and 115, respectively. The upper end of each of said actuating elements surround the pivot shaft 108, and is related thereto by mechanism hereinafter to be described. The upper end of each of said actuating elements is provided with identical apparatus and it will, accordingly, be sufficient to describe in detail only one thereof. Considering first the mechanism associated with the actuating element 104, said element 104 contains a lock pin opening 118 which communicates with a corresponding lock pin opening 117 in the pivot shaft 108, when the actuating element 104 is in a selected rotational position with respect to said pivot shaft 108. In this particular embodiment, the lock pin opening 117 is aligned with the lock pin opening 118 when the actuating element 104 is substantially parallel with the extended, lengthwise axis of the control member 98, that is, in neutral position.

A lock pin housing 119 (Figure 6), is supported upon the actuating element 104 adjacent to the lock pin opening 118 and has a cylindrical chamber 121 which is of larger cross-section than, and coaxial with, said lock pin opening 118. A lock pin 122 is slidably disposed in the lock pin opening 118 and has an enlarged head 123 disposed within the lock pin chamber 121. The pin head 123, which limits the movement of the pin 122, is secured to one end of a flexible wire 126, which extends through a wire opening 127 in the outer end wall of the lock pin housing 119. The wire 126 extends through a flexible tube 128, which is connected at its lower end to the pin housing 119 and at its upper end to a plunger housing 129. The plunger housing 129 is supported upon the upper end of the control member 98 along with the plunger housings 131 and 132.

A manually operable plunger 133 extends into, and is reciprocably supported by, the plunger housing 129. The plunger 133 has on its inner end a flange 134 which is secured to the upper end of the wire 126. A spiral spring 136, which encircles the wire 126 within the housing 129, is held under compression between the flange 134 and the end wall 137 of said housing 129, to which the tube 128 is secured. Thus, movement of the lock pin 122 into the lock pin opening 118 is resiliently opposed by the spring 136.

The actuating elements 105 and 106 are also selectively and releasably connected to the pivot shaft 108 by means such as the lock pin structure described above with respect to the actuating element 104. For convenience, the other lock pin openings in the shaft 108 corresponding to the lock pin opening 117 will be designated as lock pin openings 117a and 117b, lock pin opening 117a being associated with actuating element 105 and lock pin opening 117b being associated with actuating element 106.

The plungers 133a and 133b (Figure 6) in the plunger housings 131 and 132, respectively, will provide the manually engageable means for effecting such connection. Means, not shown, may be provided for holding one, and only one, of the plungers 133, 133a and 133b in the position where the lock pin connected thereto is disposed within the corresponding one of the lock pin openings 117a or 117b in the pivot shaft 108, after the shift lever 97 has been moved out of the neutral position.

A shift lock mechanism such as that shown at 88 in Figure 1 may be provided in the transmission with which the shift mechanism 96 is used in order to prevent more than one of the shift rods 113, 114 and 115 from being out of neutral position at one time.

When, for example, it becomes desirable to shift the rod 113 (Figures 5 and 6), the plunger 133 is operated, while the shift lever 97 is in neutral position, thereby causing the lock pin 122 to be moved into the lock pin opening 117 in the pivot shaft 108. This locks the actuating element 104 with respect to said pivot shaft 108, the elements 105 and 106 remaining free to pivot on said shaft 108. Thus, when the shift lever 97 is moved forwardly or rearwardly, i.e., caused to pivot about the pivot pin 101, the actuating element will be similarly pivoted with the control member 98. Accordingly, the shift yoke 109 and shift rod 113, associated with the actuating element 104, will be moved into the shifted position. However, the actuating elements 105 and 106 will pivot on the pivot shaft 108 and remain with their shift rods in the neutral position. The shifted rod will be returned to the neutral position by moving the control member 98 in the opposite direction.

In a similar manner, any one of the other two actuating elements 105 and 106 can be caused to move with the control member 98 about the pivot pin 101 while the remaining two actuating elements pivot on the pivot shaft 108. Thus, it will be seen that, by appropriate selection of the plungers 133, 133a and 133b, a particular actuating element 104, 105 and 106 may be caused to operate its corresponding shift rod 113, 114 and 115, respectively, when the control member 98 is pivoted around its pivot pin 101. Furthermore, the control member 98 will move substantially within one, and only one, plane regardless of which of the actuating elements 104, 105 and 106 is being operated by such movement.

It will be recognized that the modified shift mechanism 96 can be adapted for use with more or less than three shift rods as specifically and illustratively disclosed in this embodiment. As in the case of the shift mechanism 12, it is possible for the operator to operate the shift mechanism 96, including the plungers 133, 133a and 133b and the control member 98, by a single hand.

Thus, although particular preferred embodiments of the invention have been disclosed herein for illustrative purposes, it will be understood that variations or modifications of such disclosure, which lie within the scope of the appended claims, are fully contemplated.

I claim:

1. A shifting control for a change speed transmission, comprising: at least three substantially parallel shift rods, each shift rod being axially movable for effecting a change in the speed ratio of the transmission, each of said rods having a yoke thereon; a shift lever and means supporting said shift lever for pivotal movement within only one plane parallel to the direction of movement of said shift rods; a plurality of actuating elements pivotally supported near one end of each thereof upon said shift member for pivotal movement about an axis located below and parallel with the pivot axis of said shift member, each actuating element being continuously engaged with one of said shift yokes; manually selectable lock means associated with each of said actuating elements for selectively preventing pivotal movement of a selected one of said actuating elements with respect to said shift lever whereby pivotal movement of said shift lever will effect a shifting movement of a selected one of said shift rods.

2. A shifting control according to claim 1 wherein said lock means includes a pin mounted on each of said actuating elements and extendable into a recess in said shift member; a cable connected to each said pin for extending or retracting same; and manually operable means on said shift lever adjacent to the upper end thereof for actuating said cable.

References Cited in the file of this patent

UNITED STATES PATENTS

| | | |
|---|---|---|
| 2,078,474 | Watson | Apr. 27, 1937 |

FOREIGN PATENTS

| | | |
|---|---|---|
| 430,195 | Germany | June 12, 1927 |
| 456,874 | Germany | Mar. 3, 1928 |
| 455,260 | Italy | Feb. 17, 1950 |
| 485,456 | Canada | Aug. 5, 1952 |
| 717,046 | Great Britain | Oct. 20, 1954 |